US012511516B2

(12) United States Patent
Heddes et al.

(10) Patent No.: US 12,511,516 B2
(45) Date of Patent: Dec. 30, 2025

(54) TRAINING NEURAL NETWORKS BASED ON DUAL PIPELINE ARCHITECTURES

(71) Applicant: Microsoft Technology Licensing, LLC, Redmond, WA (US)

(72) Inventors: Mattheus Heddes, Woodinville, WA (US); Torsten Hoefler, Zurich (CH); Kenneth Andrew Colwell, Stevens Pass, WA (US); Amar Phanishayee, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1131 days.

(21) Appl. No.: 17/151,007

(22) Filed: Jan. 15, 2021

(65) Prior Publication Data

US 2022/0138524 A1    May 5, 2022

Related U.S. Application Data

(60) Provisional application No. 63/107,385, filed on Oct. 29, 2020.

(51) Int. Cl.
*G06N 3/04* (2023.01)
*G06N 3/084* (2023.01)

(52) U.S. Cl.
CPC ............. *G06N 3/04* (2013.01); *G06N 3/084* (2013.01)

(58) Field of Classification Search
CPC .......... G06N 3/04; G06N 3/084; G06N 3/045; G06N 3/63
See application file for complete search history.

(56) References Cited

U.S. PATENT DOCUMENTS

2018/0293777 A1* 10/2018 Sarel ............. G06N 3/045
2018/0314941 A1* 11/2018 Lie ............... G06F 9/45533
2019/0362227 A1  11/2019 Seshadri et al.

OTHER PUBLICATIONS

Alqahtani et al., "Performance Analysis and Comparison of Distributed Machine Learning Systems". (Year: 2019).*
Gunther et al., "Layer-Parallel Training of Deep Residual Neural Networks", Sandia National Laboratories. (Year: 2019).*
Kauschke et al., "Patching Deep Neural Networks for Nonstationary Environments", Intl. Joint. Conf. on Neural Networks 2019. (Year: 2019).*

(Continued)

*Primary Examiner* — Marshall L Werner
(74) *Attorney, Agent, or Firm* — Holzer Patel Drennan

(57) ABSTRACT

Embodiments of the present disclosure include systems and methods for training neural networks based on dual pipeline architectures. In some embodiments, a first set of compute elements are configured to implement a first set of layers of a first instance of a neural network. A second set of compute elements are configured to implement a second set of layers of the first instance of the neural network. The second set of compute elements are further configured to implement a first set of layers of a second instance of the neural network. The first set of compute elements are further configured to implement a second set of layers of the second instance of the neural network. The first set of layers of the first instance of the neural network and the first set of layers of the second instance of the neural network are each configured to receive training data.

16 Claims, 10 Drawing Sheets

(56) References Cited

OTHER PUBLICATIONS

Shrivastava et al., "A Data and Model-Parallel, Distributed and Scalable Framework for Training of Deep Networks in Apache Spark" (Year: 2017).*
Harlap et al., PipeDream: Fast and Efficient Pipeline Parallel DNN Training, Jun. 2018. (Year: 2018).*
Narayanan, et al., "Memory-Efficient Pipeline-Parallel DNN Training", In Repository of arXiv:2006.09503v1, Jun. 16, 2020, 12 Pages.
Narayanan, et al., "PipeDream: Generalized Pipeline Parallelism for DNN Training", In Proceedings of the 27th ACM Symposium on Operating Systems Principles, Oct. 27, 2019, 15 Pages.
"International Search Report and Written Opinion Issued in PCT Application No. PCT/US21/048308", Mailed Date: Dec. 23, 2021, 11 Pages.
Communication pursuant to Article 94(3) EPC, Received for European Application No. 21773986.1, mailed on Oct. 2, 2025, 6 pages.

* cited by examiner

| | P0 | P1 | P2 | P3 | Mem-P0 | Mem-P1 | Mem-P2 | Mem-P3 |
|---|---|---|---|---|---|---|---|---|
| T=0 | B0=FF0(A0) | | | | A0 | | | |
| T=1 | | C0=FF1(B0) | | | A0 | B0 | | |
| T=2 | B1=FF0(A1) | | D0=FF2(C0) | | A0,A1 | B0 | C0 | |
| T=3 | | C1=FF1(B1) | | E0=FF3(D0) | A0,A1 | B0,B1 | C0 | D0 |
| T=4 | B2=FF0(A2) | | D1=FF2(C1) | I0=BP3(E0,D0) | A0,A1,A2 | B0,B1 | C0,C1 | D0 |
| T=5 | | C2=FF1(B2) | H0=BP2(I0,C0) | E1=FF3(D1) | A0,A1,A2 | B0,B1,B2 | C0,C1 | D1 |
| T=6 | B3=FF0(A3) | | D2=FF2(C2) | I1=BP3(E1,D1) | A0,A1,A2,A3 | B0,B1,B2 | C1,C2 | D1 |
| T=7 | F0=BP0(G0,A0) | C3=FF1(B3) | H1=BP2(I1,C1) | E2=FF3(D2) | A0,A1,A2,A3 | B1,B2,B3 | C1,C2 | D2 |
| T=8 | B4=FF0(A4) | G1=BP1(H1,B1) | D3=FF2(C3) | I2=BP3(E2,D2) | A1,A2,A3,A4 | B2,B3,B4 | C2,C3 | D2 |
| T=9 | F1=BP0(G1,A1) | C4=FF1(B4) | H2=BP2(I2,C2) | E3=FF3(D3) | A1,A2,A3,A4 | B2,B3,B4 | C2,C3 | D3 |
| T=10 | B5=FF0(A5) | G2=BP1(H2,B2) | D4=FF2(C4) | I3=BP3(E3,D3) | A2,A3,A4,A5 | B3,B4,B5 | C3,C4 | D3 |
| T=11 | F2=BP0(G2,A2) | C5=FF1(B5) | H3=BP2(I3,C3) | E4=FF3(D4) | A2,A3,A4,A5 | B3,B4,B5 | C3,C4 | D4 |
| T=12 | B6=FF0(A6) | G3=BP1(H3,B3) | D5=FF2(C5) | I4=BP3(E4,D4) | A3,A4,A5,A6 | B4,B5,B6 | C4,C5 | D4 |
| T=13 | F3=BP0(G3,A3) | C6=FF1(B6) | H4=BP2(I4,C4) | E5=FF3(D5) | A3,A4,A5,A6 | B4,B5,B6 | C4,C5 | D5 |

FIG. 5

| | P0 | P1 | P2 | P3 | Mem-P0 | Mem-P1 | Mem-P2 | Mem-P3 |
|---|---|---|---|---|---|---|---|---|
| T=0 | B0=FF0(A0) | | | | A0 | | | |
| T=1 | | C0=FF1(B0) | | | A0 | B0 | | |
| T=2 | B1=FF0(A1) | | D0=FF2(C0) | | A0,A1 | B0 | C0 | |
| T=3 | | C1=FF1(B1) | | E0=FF3(D0) | A0,A1 | B0,B1 | C0 | D0 |
| T=4 | B2=FF0(A2) | | D1=FF2(C1) | I0=BP3(E0,D0) | A0,A1,A2 | B0,B1 | C0,C1 | D0 |
| T=5 | | C2=FF1(B2) | H0=BP2(I0,C0) | E1=FF3(D1) | A0,A1,A2 | B0,B1,B2 | C0,C1 | D1 |
| T=6 | B3=FF0(A3) | G0=BP1(H0,B0) | D2=FF2(C2) | I1=BP3(E1,D1) | A0,A1,A2 | B0,B1,B2 | C1,C2 | D1,A3 |
| T=7 | F0=BP0(G0,A0) | C3=FF1(B3) | H1=BP2(I1,C1) | E2=FF3(D2) | A0,A1,A2 | B1,B2,B3 | C1,C2 | D2,A3 |
| T=8 | B4=FF0(A4) | G1=BP1(H1,B1) | D3=FF2(C3) | I2=BP3(E2,D2) | A1,A2,A4 | B1,B2,B3 | C2,C3 | D2,A3 |
| T=9 | F1=BP0(G1,A1) | C4=FF1(B4) | H2=BP2(I2,C2) | E3=FF3(D3) | A1,A2,A4 | B2,B3,B4 | C2,C3 | D3,A3 |
| T=10 | B5=FF0(A5) | G2=BP1(H2,B2) | D4=FF2(C4) | I3=BP3(E3,D3) | A2,A4,A5 | B2,B3,B4 | C3,C4 | D3,A3 |
| T=11 | F2=BP0(G2,A2) | C5=FF1(B5) | H3=BP2(I3,C3) | E4=FF3(D4) | A2,A4,A5 | B3,B4,B5 | C3,C4 | D4,A3 |
| T=12 | B6=FF0(A6) | G3=BP1(H3,B3) | D5=FF2(C5) | I4=BP3(E4,D4) | A4,A5,A6 | B3,B4,B5 | C4,C5 | D4,A3 |
| T=13 | F3=BP0(G3,A3) | C6=FF1(B6) | H4=BP2(I4,C4) | E5=FF3(D5) | A4,A5,A6 | B4,B5,B6 | C4,C5 | D5 |
| T=14 | B7=FF0(A7) | G4=BP1(H4,B4) | D6=FF2(C6) | I5=BP3(E5,D5) | A5,A6 | B4,B5,B6 | C5,C6 | D5,A7 |
| T=15 | F4=BP0(G4,A4) | C7=FF1(B7) | H5=BP2(I5,C5) | E6=FF3(D6) | A4,A5,A6 | B5,B6,B7 | C5,C6 | D6,A7 |
| T=16 | B8=FF0(A8) | G5=BP1(H5,B5) | D7=FF2(C7) | I6=BP3(E6,D6) | A5,A6,A8 | B5,B6,B7 | C6,C7 | D6,A7 |
| T=17 | F5=BP0(G5,A5) | C8=FF1(B8) | H6=BP2(I6,C6) | E7=FF3(D7) | A5,A6,A8 | B6,B7,B8 | C6,C7 | D7,A7 |

FIG. 6

| | P0 | P1 | P2 | P3 | Mem for P0 |
|---|---|---|---|---|---|
| T=0 | | | | | A0 |
| T=1 | B0=FF0(A0) | C0=FF1(B0) | | | A0,A1 |
| T=2 | B1=FF0(A1) | C1=FF1(B1) | D0=FF2(C0) | | A0,A1,A2 |
| T=3 | B2=FF0(A2) | C2=FF1(B2) | D1=FF2(C1) | | A0,A1,A2,A3 |
| T=6 | B3=FF0(A3) | C3=FF1(B3) | D2=FF2(C2)<br>H0=BP2(I0,C0) | E0=FF3(D0)<br>I0=BP3(E0,D0) | A0,A1,A2,A3,A4 |
| T=9 | B4=FF0(A4) | C4=FF1(B4)<br>G0=BP1(H0,B0) | D3=FF2(C3)<br>H1=BP2(I1,C1) | E1=FF3(D1)<br>I1=BP3(E1,D1) | A0,A1,A2,A3,A4,A5 |
| T=12 | B5=FF0(A5) | C5=FF1(B5)<br>G1=BP1(H1,B1) | D4=FF2(C4)<br>H2=BP2(I2,C2) | E2=FF3(D2)<br>I2=BP3(E2,D2) | A0,A1,A2,A3,A4,A5,A6 |
| T=15 | B6=FF0(A6)<br>F0=BP0(G0,A0) | C6=FF1(B6)<br>G2=BP1(H2,B2) | D5=FF2(C5)<br>H3=BP2(I3,C3) | E3=FF3(D3)<br>I3=BP3(E3,D3) | A1,A2,A3,A4,A5,A6,A7 |
| T=18 | B7=FF0(A7)<br>F1=BP0(G1,A1) | C7=FF1(B7)<br>G3=BP1(H3,B3) | H4=BP2(I4,C4) | E4=FF3(D4)<br>I4=BP3(E4,D4) | A2,A3,A4,A5,A6,A7 |
| T=21 | F2=BP0(G2,A2) | G4=BP1(H4,B4) | H5=BP2(I5,C5) | E5=FF3(D5)<br>I5=BP3(E5,D5) | A3,A4,A5,A6,A7 |
| T=24 | F3=BP0(G3,A3) | G5=BP1(H5,B5) | H6=BP2(I6,C6) | E6=FF3(D6)<br>I6=BP3(E6,D6) | A4,A5,A6,A7 |
| T=27 | F4=BP0(G4,A4) | G6=BP1(H6,B6) | H7=BP2(I7,C7) | E7=FF3(D7)<br>I7=BP3(E7,D7) | A5,A6,A7 |
| T=29 | F5=BP0(G5,A5) | G7=BP1(H7,B7) | | | A6,A7 |
| T=31 | F6=BP0(G6,A6) | | | | A7 |
| T=33 | F7=BP0(G7,A7) | | | | |

FIG. 7

| | P0 | P1 | P2 | P3 | Mem for P0 |
|---|---|---|---|---|---|
| T=0 | B0=FF0(A0) | | | B0=FF0(A0) | A0 |
| T=1 | | C0=FF1(B0) | C0=FF1(B0) | | A0 |
| T=2 | B1=FF0(A1) | D0=FF2(C0) | D0=FF2(C0) | B1=FF0(A1) | A0,A1 |
| T=3 | E0=FF3(D0) | C1=FF1(B1) | C1=FF1(B1) | E0=FF3(D0) | A0,A1 |
| T=4 | B2=FF0(A2)<br>I0=BP3(E0,D0) | D1=FF2(C1) | D1=FF2(C1) | I0=BP3(E0,D0)<br>B2=FF0(A2) | A0,A1,A2 |
| T=7 | E1=FF3(D1) | C2=FF1(B2)<br>H0=BP2(I0,C0) | H0=BP2(I0,C0)<br>C2=FF1(B2) | E1=FF3(D1) | A0,A1,A2 |
| T=10 | B3=FF0(A3)<br>I1=BP3(E1,D1) | G0=BP1(H0,B0)<br>D2=FF2(C2) | D2=FF2(C2)<br>G0=BP1(H0,B0) | I1=BP3(E1,D1)<br>B3=FF0(A3) | A0,A1,A2,A3 |
| T=13 | F0=BP0(G0,A0)<br>E2=FF3(D2) | C3=FF1(B3)<br>H1=BP2(I1,C1) | H1=BP2(I1,C1)<br>C3=FF1(B3) | E2=FF3(D2)<br>F0=BP0(G0,A0) | A0,A1,A2,A3 |
| T=16 | I2=BP3(E2,D2) | G1=BP1(H1,B1)<br>D3=FF2(C3) | D3=FF2(C3)<br>G1=BP1(H1,B1) | I2=BP3(E2,D2) | A1,A2,A3 |
| T=19 | F1=BP0(G1,A1)<br>E3=FF3(D3) | H2=BP2(I2,C2) | H2=BP2(I2,C2) | E3=FF3(D3)<br>F1=BP0(G1,A1) | A1,A2,A3 |
| T=22 | I3=BP3(E3,D3) | G2=BP1(H2,B2) | G2=BP1(H2,B2) | I3=BP3(E3,D3) | A2,A3 |
| T=24 | F2=BP0(G2,A2) | H3=BP2(I3,C3) | H3=BP2(I3,C3) | F2=BP0(G2,A2) | A2,A3 |
| T=26 | | G3=BP1(H3,B3) | G3=BP1(H3,B3) | | A3 |
| T=28 | F3=BP0(G3,A3) | H4=BP2(I4,C4) | | F3=BP0(G3,A3) | A3 |
| T=30 | | | | | |

FIG. 9

TRAINING NEURAL NETWORKS BASED ON DUAL PIPELINE ARCHITECTURES

CROSS-REFERENCE TO RELATED APPLICATION

The present application claims the benefit and priority of U.S. Provisional Application No. 63/107,385, filed Oct. 29, 2020, entitled "Training Neural Networks Based on Dual Pipeline Architectures," the entire contents of which are incorporated herein by reference in its entirety for all purposes.

BACKGROUND

The present disclosure relates to a computing system. More particularly, the present disclosure relates to techniques for training a neural network.

A neural network is a machine learning model that is trained for a particular purpose by running datasets through it, comparing results from the neural network to known results, and updating the network based on the differences.

Deep neural networks (DNNs) typically have an input layer, an output layer, and hidden layers between the input layer and the output layer. Large DNNs with many hidden layers may be implemented using distributed systems comprised of multiple compute elements (e.g., artificial intelligence (AI) accelerators, computing devices, graphics processing units (GPUs), field-programmable gate arrays (FPGAs), application-specific integrated circuits (ASICs), etc.). The distributed systems that can be used to implement large DNNs have many areas where improvements may be made. Examples of such areas include data parallelism, model parallelism, pipeline parallelism, etc.

BRIEF DESCRIPTION OF THE DRAWINGS

Various embodiments of the present disclosure are illustrated by way of example and not limitation in the figures of the accompanying drawings.

FIG. 5 illustrates a time sequence of processing multiple sets of training data through the neural network illustrated in FIG. 3 according to some embodiments.

FIG. 6 illustrates a time sequence of processing multiple sets of training data through the neural network illustrated in FIG. 3 using a distributed storage technique according to some embodiments.

FIG. 7 illustrates another time sequence of processing multiple sets of training data through the neural network illustrated in FIG. 3 according to some embodiments.

FIG. 9 illustrates a time sequence of processing multiple sets of training data through the neural network illustrated in FIG. 8 according to some embodiments.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for training neural networks based on dual pipeline architectures. In some embodiments, dual pipelines operating in parallel are configured to train a neural network. Specifically, a first pipeline may be used to implement a first instance of the neural network. A second pipeline can be used to implement a second instance of the same neural network. Several compute elements may be configured to implement the dual pipelines. In some embodiments, the two pipelines are implemented across the compute elements in opposite directions. In this manner, the first instance of the neural network can be trained by processing data from one end while the second instance of the neural network can be trained by processing data from the other end.

The techniques described in the present application provide a number of benefits and advantages over conventional methods of training neural networks. For instance, by implementing two pipelines in opposite directions to train two instances of the same neural network, the amount of memory used by some of the compute elements are reduced and utilization of memory across all the compute elements are improved. In addition, using these techniques improves the efficiency of training of the neural network (e.g., it takes less time to train the neural network).

Figure 1:
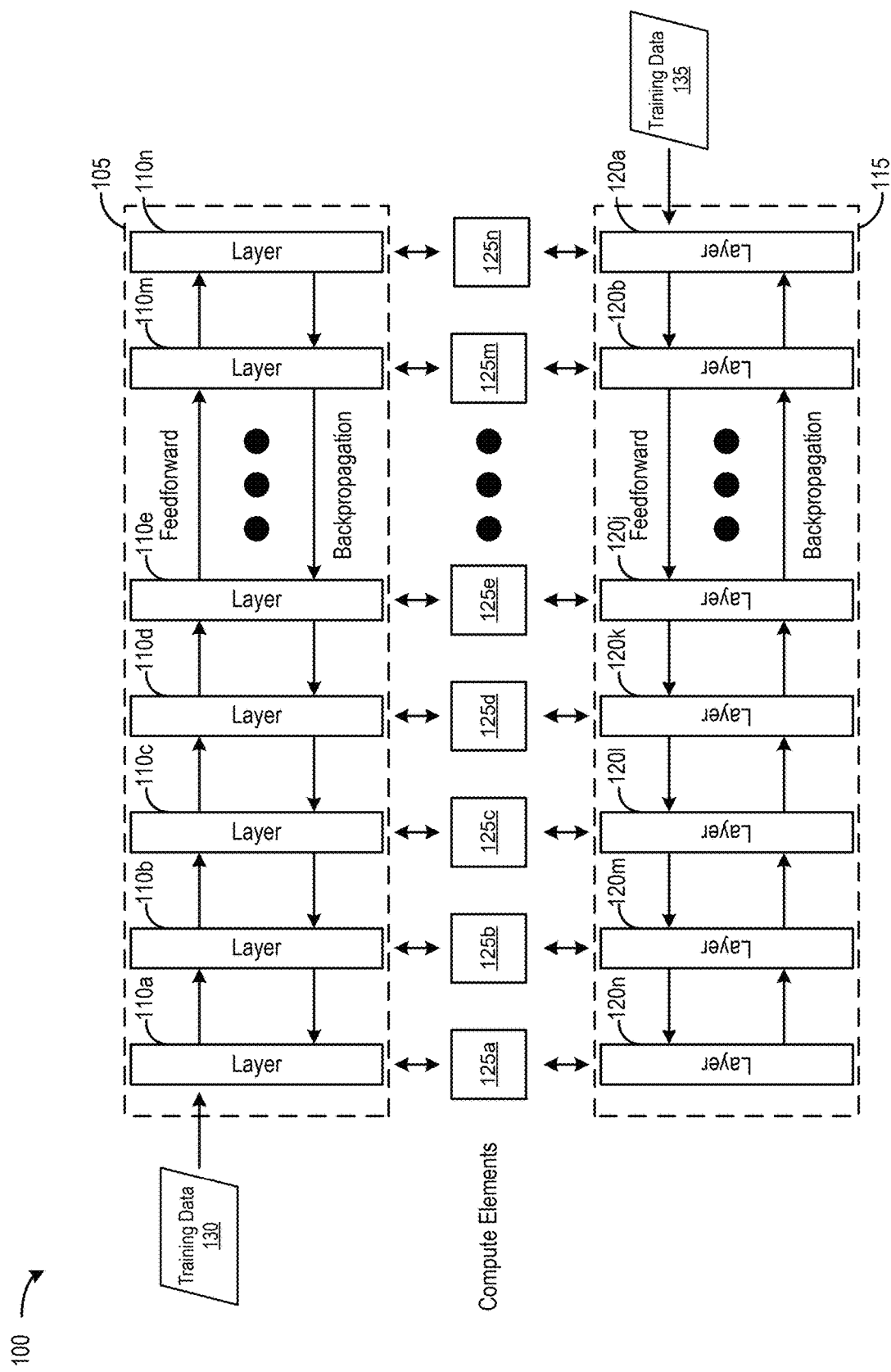
FIG. 1 illustrates a dual pipeline architecture for training a neural network according to some embodiments.

FIG. 1 illustrates a dual pipeline architecture 100 for training a neural network according to some embodiments. As shown, dual pipeline architecture 100 includes pipeline 105, compute elements 125a-n, and pipeline 115. In this example, dual pipeline architecture 100 is used to train a neural network that has n number of layers. In particular, pipeline 105 is used to implement a first instance of the neural network and pipeline 115 is used to implement a second instance of the same neural network.

Each of the compute elements 125a-n is configured to implement parts of, or entire, neural networks. In some embodiments, compute elements 125 a-n are designed to accelerate artificial intelligence (AI) applications (e.g., artificial neural networks, recurrent neural network, machine vision, machine learning, etc.). Each of the compute elements 125a-n may be implemented as computing hardware. Examples of such computing hardware include AI accelerators, general purpose computing devices, graphics processing units (GPUs), field-programmable gate arrays (FPGAs), application-specific integrated circuits (ASICs), etc.

As mentioned above, pipeline 105 is being used to implement a first instance of a neural network. As illustrated in FIG. 1, the first instance of the neural network includes layers 110a-n. Each of the layers 110a-n is implemented on a corresponding compute element 125. As shown, layer 110a is configured to receive training data 130. Training data 130 is processed through layers 110a-n during a feedforward stage of training the first instance of the neural network. During a backpropagation stage of training, the training data 130 is processed back through layers 110*a-n* in the opposite direction. In some embodiments, the backpropagation stage is used to update weights in each of the layers 110*a-n*.

As explained above, pipeline 115 is being used to implement a second instance of the same neural network implemented by pipeline 105. As shown in FIG. 1, the second instance of the neural network includes layers 120*a-n*. Each of the layers 120*a-n* is implemented on a corresponding compute element 125. As illustrated, the second instance of the neural network is implemented in the opposite direction as the first instance of the neural network. That is, compute element 125*n* is configured to implement the first layer 120*a* of the second instance of the neural network while compute element 125*a* is configured to implement the first layer 110*a* of the first instance of the neural network. As shown, layer 120*a* is configured to receive training data 135. Training data 130 is processed through layers 120*a-n* during a feedforward stage of training the second instance of the neural network. During a backpropagation stage of training, the training data 130 is processed back through layers 110*a-n* in the opposite direction. The backpropagation stage is used to update weights in each of the layers 120*a-n* in some embodiments.

Figure 2:
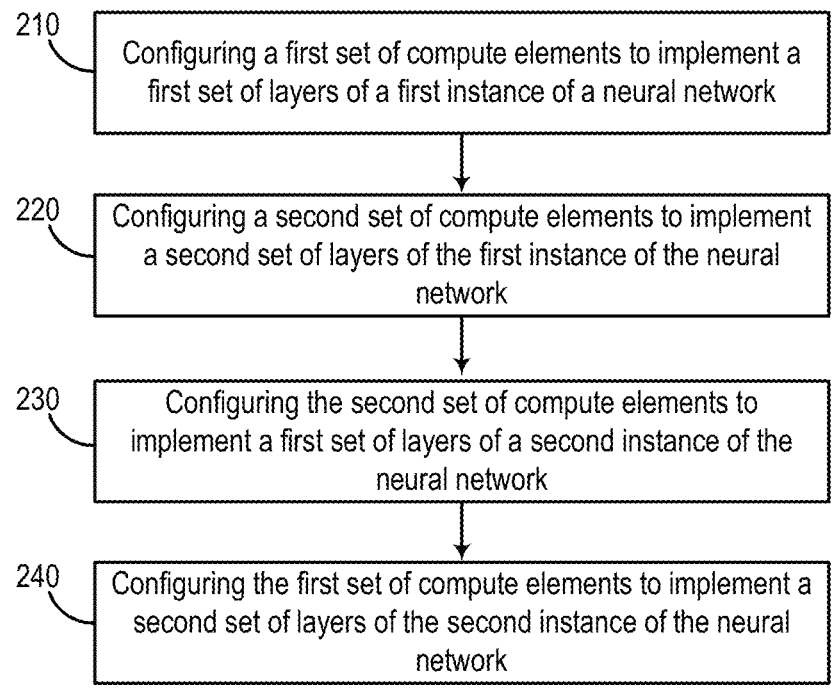
FIG. 2 illustrates a process for training a neural network according to some embodiments.

FIG. 2 illustrates a process 200 for training a neural network according to some embodiments. In some embodiments, dual pipeline architecture 100 performs process 200. Process 200 starts by configuring, at 210, a first set of compute elements to implement a first set of layers of a first instance of a neural network. Referring to FIG. 1 as an example, compute element 125*a* may be configured to implement layer 110*a* of the first instance of a neural network.

Next, process 200 configures, at 220, a second set of compute elements to implement a second set of layers of the first instance of the neural network. Referring to FIG. 1 as an example, compute element 125*n* can be configured to implement layer 110*n* of the first instance of the neural network. Then, process 200 configures, at 230, the second set of compute elements to implement a first set of layers of a second instance of the neural network. Referring to FIG. 1 as an example, compute element 125*n* may be configured to implement layer 120*a* of the second instance of the neural network.

Finally, process 200 configures, at 240, the first set of compute elements to implement a second set of layers of the second instance of the neural network. Referring to FIG. 1 as an example, compute element 125*a* may be configured to implement layer 120*n* of the second instance of the neural network. As shown in FIG. 1, the first set of layers of the first instance of the neural network and the first set of layers of the second instance of the neural network are each configured to receive training data.

EXAMPLES

Figures 3, 4:
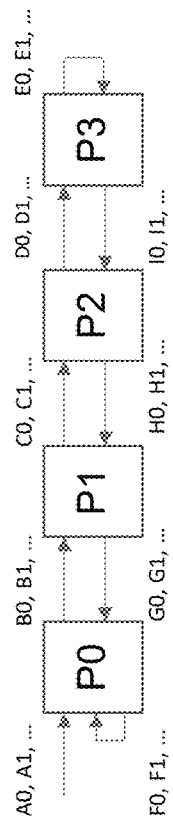
FIG. 3 illustrates a single pipeline for training a neural network according to some embodiments.
FIG. 4 illustrates a time sequence of processing a set of training data through the neural network illustrated in FIG. 3 according to some embodiments.

FIG. 3 illustrates a single pipeline 300 for training a neural network according to some embodiments. In pipeline parallelism, multiple compute elements (P0-P3 in the example) are organized in a pipeline. For this example, the neural network includes four layers. Each layer of the neural network is being implemented by one of the compute elements P0-P3. Here, the first layer is being implemented on compute element P0, the second layer is being implemented on compute element P1, the third layer is being implemented on compute element P2, and the fourth layer is being implemented on compute element P3. One of ordinary skill in the art will understand that the neural network may include additional layers and/or each compute element can implement more than one layer of the neural network. For instance, a neural network may have eight layer and two layers of the neural network can be implemented on each of the compute elements P0-P3.

In some embodiments, the training process of a neural network consists of two stages/phases: a feedforward phase and a backpropagation phase. In a feedforward pass, a training sample is processed by the neural network. The first layer processes the input sample and produces an output. The next layer (e.g., a second layer) processes the output generated by the first layer and generates its own output. The next layer (e.g., a third layer) processes the output generated by the first layer and generates its own output. This continues until the last layer produces an output. This last output calculates a cost-function. The output is compared with an expected value and an error signal is calculated. The error is then back-propagated as follows. The last layer runs a back-propagation algorithm, which is used to update the parameters of the layer and to calculate an error signal, which is sent to the previous layer (e.g., the second to last layer). The previous layer runs a back-propagation algorithm that is used to update its own parameters and calculate an error signal, which is sent to the previous layer (e.g., the third to last layer). The previous layer also runs a back-propagation algorithm that is used to update its own parameters and calculate an error signal, which is sent to the previous layer (e.g., the fourth to last layer). This continues until the error signal has reached the first layer which updates its parameters.

FIG. 4 illustrates a time sequence of processing a set of training data through the neural network illustrated in FIG. 3 according to some embodiments. Specifically, FIG. 4 illustrates a table 400 showing a time-sequence of processing one training sample through the neural network. We use the following notation: <letter><sample-number>. The letter denotes the pipeline stage and the sample-number is the number of the training sample. In this example, A0 is the first training sample, A1 the second training sample, A2 the third training sample, etc. Bn is the nth output of the feedforward pass of the first layer, Cn is the nth output of the second layer, etc. For the backpropagation pass, we start with I. That is, In is the nth error signal generated by the last layer, Hn is the nth error signal generated by the second to last layer, etc.

For table 400, FF0 denotes the feedforward pass of layer 0. For example, at time T=0, the first layer implemented on compute element P0 executes B0=FF0(A0) where A0 is the input training sample and B0 is the output generated by the first layer (compute element P0 in this example) based on the input training sample A0. The first layer sends the output B0 to the next layer in the neural network (the next stage in the pipeline for this example), which is implemented on compute element P1. At time T=3, the final output E0 is produced by the fourth layer in the neural network (the last stage in the pipeline, for this example, which is implemented on compute element P3) based on the output D0 generated by the third layer of the neural network (compute element P2 in this example). Then at time T=4, the backpropagation starts at the fourth layer of the neural network (compute element P3 in this example). To keep the notation simple, the cost function is ignored. The fourth layer calculates a new error signal, I0, and sends it to the previous layer in the neural network. When the first layer in the neural network implemented on compute element P0 runs the backpropagation algorithm at time T=7, the processing of the first training sample is finished.

The backpropagation at each layer uses two inputs: the error signal from the higher layer and the input from the previous layer that was used during the feedforward pass. For instance, at time T=7, the first layer in the neural network implemented on compute element P0 calculates F0=BP0(G0,A0) where G0 is the error signal received from the second layer implemented on compute element P1 and A0 is the input used in the feedforward pass of training data sample 0. Thus, at time T=0, the first layer stores A0 in memory since it is required at time T=7. The right columns in table 400 show the memory requirements for storing the output of the feedforward stage in each of the compute elements P0-P3. Storing the outputs during the feedforward stage may also be referred to as "stashing activations".

FIG. 5 illustrates a time sequence of processing multiple sets of training data through the neural network illustrated in FIG. 3 according to some embodiments. In particular, FIG. 5 illustrates a table 500 showing a time-sequence of processing several training samples through the neural network. Table 500 illustrates the operation of the pipeline when multiple training samples are processed through it. As depicted in table 500, a first training sample A0 enters the first layer of the pipeline at time T=0, a second training sample A1 enters the first layer of the pipeline at time T=2, etc. Note that the pipeline can accept a sample every two cycles because in the steady state each layer of the neural network processes a feedforward pass and a backpropagation pass (assuming that each pass takes one cycle).

As shown, the compute elements that implement the layers in the neural network each uses different amounts of memory for stashing activations. For instance, compute element P0, which implements the first layer of the neural network, uses memory to store four activations and the compute element P3, which implements the fourth layer in the neural network, uses memory to store only one activation. In general, for N pipeline stages, the first stage stores N activations, the second stage stores N−1 activations, the third stage stores N−2 activations, etc. For large neural nets, this can amount to a very large amount of memory (e.g. in the gigabyte range). Thus, the pipeline stages close to the beginning of the pipeline utilize more memory and the pipeline stages towards the end of the pipeline utilize less memory. One objective of the invention is to balance the memory use so that all pipeline stages use approximately the same amount of memory to store activations.

FIG. 6 illustrates a time sequence of processing multiple sets of training data through the neural network illustrated in FIG. 3 using a distributed storage technique according to some embodiments. Specifically, FIG. 6 illustrates a table 600 showing a time-sequence of processing several training samples through the neural network using a distributed storage technique. The original storage requirement across compute elements P0, P1, P2, P3 during the steady state was four activations, three activations, two activations, and one activation, respectively, as illustrated in table 500. In embodiments where a compute element implements one layer of a neural network, a given compute element $P_k$, stores l−k activations where l is the number of layers in the neural network and k is position of the compute element in the pipeline starting with k=0 for the first position in the pipeline. Across all compute elements, the storage equals to $\Sigma_k$−k=(l²+l)/2. If the storage is distributed equally across all levels, we get l+1/2 per layer, which is approximately half of the original storage at compute element P0. Now one layer, the first half of the compute elements P0 . . . P(l/2−1) get a budget of $$\left\lceil \frac{l+1}{2} \right\rceil$$

activations and the second half of the compute elements P(l/2) . . . P(l−1) get a budget of $$\left\lfloor \frac{l+1}{2} \right\rfloor$$

activations. When that budget is exhausted, compute element k sends elements to processor l−(k−1). So the first compute element sends extra activations to the last compute element, the second compute element sends extra activations to the second to last compute element, etc. The scheduling of this distributed storage of activations is illustrated in table 600. In the backpropagation, if a particular compute element needs an activation that is stored in another compute element, the particular compute element k can retrieve the activation back from processor l−(k−1).

FIG. 7 illustrates another time sequence of processing multiple sets of training data through the neural network illustrated in FIG. 3 according to some embodiments. In particular, FIG. 7 illustrates a table 700 showing a time-sequence of processing several training samples through the neural network under the assumption that a backpropagation operation takes twice as many cycles to perform as a feedforward operation. For example, at time T=12, the feedforward operation performed at the first layer implemented on compute element P0 based on the input training sample A6 takes one cycle. Next, at time T=13 (not indicated), a backpropagation operation performed at the first layer based on the error G0 received from the second layer and the training sample A0 takes two cycles. Then, at time T=15, the next feedforward operation is performed at the first layer on the training sample A7.

While FIG. 7 illustrates a time-sequence of processing several training samples through the neural network where a backpropagation operation takes twice as many cycles to perform as a feedforward operation, one of ordinary skill in the art will understand that the number of cycles it takes to perform a backpropagation operation relative to a feedforward operation can be different. For example, in some instances, a backpropagation operation can take three cycles to perform compared to one cycle to perform a feedforward operation (i.e., a backpropagation operation in this example takes 3× the number of cycles of a feedforward operation). Different cycles for backpropagation and feedforward operations are possible.

Table 700 shows the neural network illustrated in FIG. 3 processing eight training samples A0-A7. As such, the number of training samples is twice the length of the pipeline. As explained above, a backpropagation operation takes twice as many cycles to perform as a feedforward operation. Thus, it takes 33 cycles to process the eight training samples, as illustrated in table 700. 12 units of work (i.e., cycles) are used to process one training sample. Since there are eight training samples in this example, 96 units of work is needed. The total available computation units (i.e., cycles) across the compute elements P0-P3 is 132 units (33×4). Processing the eight training samples results in an efficiency of 72.7% (96/132).

In general, it takes L+2 cycles for the first sample to be completely processed at the last layer (both feedforward and backpropagation operations) of the pipeline. It takes (L−1) *3 cycles for the first sample to go from the last layer to the first layer and be completely processed by the first layer. For every additional sample 3 cycles are added for the steady state. The postlude takes 2 cycles instead of 3. Therefore, the total number of cycles is L+2+3*(L−1)+3*(N−1)−(L−1)=3+3*(L+N−2) where L is the number of layers in the neural network and N is the number of training samples. The work done to process N samples is N*3L=3NL units of work. The available computation units is (3+3*(L+N−2))*L. The efficiency is 3NL/((3+3*(L+N−2))*L)=3N/(3+3*(L+N−2)). For N=8 and L=4, the efficiency is 73%. For N=16 and L=4, the efficiency is 84%. For an infinite number of training samples, the efficiency is 100%. For N=840 and L=420, the efficiency is 67%. For N=1680 and L=420, the efficiency is 80%.

Figure 8:
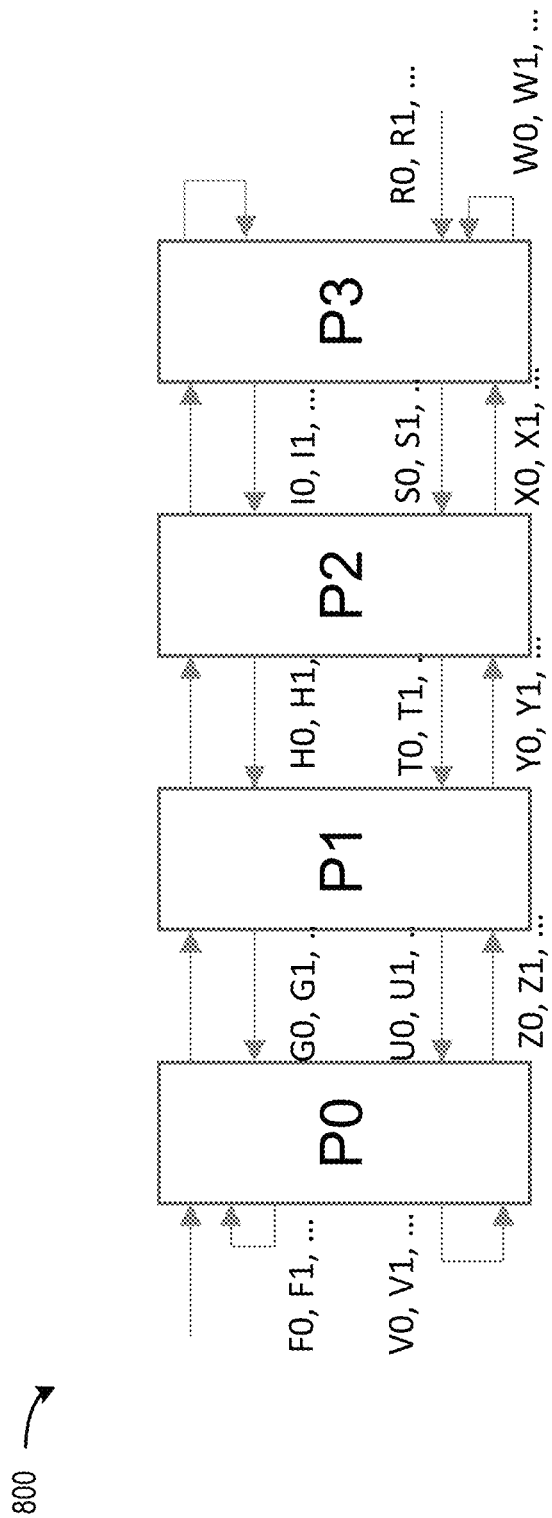
FIG. 8 illustrates a dual pipeline architecture for a neural network according to some embodiments.

FIG. 8 illustrates a dual pipeline architecture 800 for a neural network according to some embodiments. FIG. 8 shows a second pipeline (i.e. double pipeline) added to the single pipeline illustrated in FIG. 3. The first pipeline implements a first instance of the neural network while the second pipeline implements a second instance of the same neural network. The second pipeline is "mirrored" compared to the first pipeline shown in FIG. 3. That is, training samples (R0, R1, etc. in this example) enter on the right, at P3, and the feedforward pass operates from right to left. Then, the backpropagation operates from left to right. Now, at time T=0, the first training sample of the second pipeline, R0, is processed by P3 (S0=FF0(R0)). Also at time T=0, the first pipeline is also running in parallel. Hence, the first training sample A0 is processed by P0. As such, each of the compute elements P0-P3 stores activations for both processing pipelines.

FIG. 9 illustrates a time sequence of processing multiple sets of training data through the neural network illustrated in FIG. 8 according to some embodiments. Specifically, FIG. 9 illustrates a table 900 showing a time-sequence of processing several training samples through the neural network under the assumption that a backpropagation operation takes twice as many cycles to perform as a feedforward operation. As shown in FIG. 9, it takes 30 cycles to process the eight training samples (each pipeline processes four training samples). 12 units of work (i.e., cycles) are used to process one training sample. As there are eight training samples in this example, 96 units of work is needed. The total available computation units (i.e., cycles) across the compute elements P0-P3 is 120 units (30×4). Processing the eight training samples results in an efficiency of 80.0% (96/120).

In general, where L is the number of layers in the neural network, it takes L cycles for the first training sample in each pipeline to be processed through the feedforward phase. It takes 3L cycles for the first sample in each pipeline to be processed through the backpropagation phase. For every additional sample processed by both pipelines adds six cycles. The postlude takes 2 cycles instead of 3. As such, the total number of cycles is 4L+6(N−1)−L=3L+6(N−1) where L is the number of layers in the neural network and N is the number of training samples. The work done to process N samples is 2×N*3L=6NL units of work. The available computation units is (3L+6(N−1))*L. The efficiency is 6NL/((3L+6(N−1))*L)=6N/(3L+6(N−1)). For N=8 and L=4, the efficiency is 80%. For an infinite number of training samples, the efficiency is 100%. For N=420 and L=420, the efficiency is 67%. For N=840 and L=420, the efficiency is 80%. Therefore, for a single pipeline architecture, the efficiency is 3N/(3+3*(L+N−2))=3N/(3+3L+3N−6)~=N/(L+N). Replacing N with 2N, the efficiency is 2N/(L+2N)=N/(L/2+N). For a dual pipeline architecture, the efficiency is 6N/(3L+6(N−1))=6N/(3L+6N−6)~=N/(L/2+N).

In some embodiments, a pipeline for training neural networks is configured to process training samples at defined intervals. Referring to tables 500 and 600 as an example, training samples are processed every second cycle. In some cases, a pipeline can be configured to process training samples based on the slowest compute element in the pipeline. For instance, the number of cycles it takes for a compute element to process a backpropagation operation may be taken into account when defining the interval. For instance, table 900 depicts a time-sequence of processing training samples through a neural network where a backpropagation operation takes twice as many cycles to perform as a feedforward operation. As shown in table 900, the pipeline is configured to process training samples every three cycles. Table 900 also illustrates that, for dual pipeline architectures, both pipelines are configured to process training samples at the same defined interval. The defining of the interval at which a pipeline or dual pipelines process training samples is important to regulate the memory consumption and the schedule.

Figure 10:
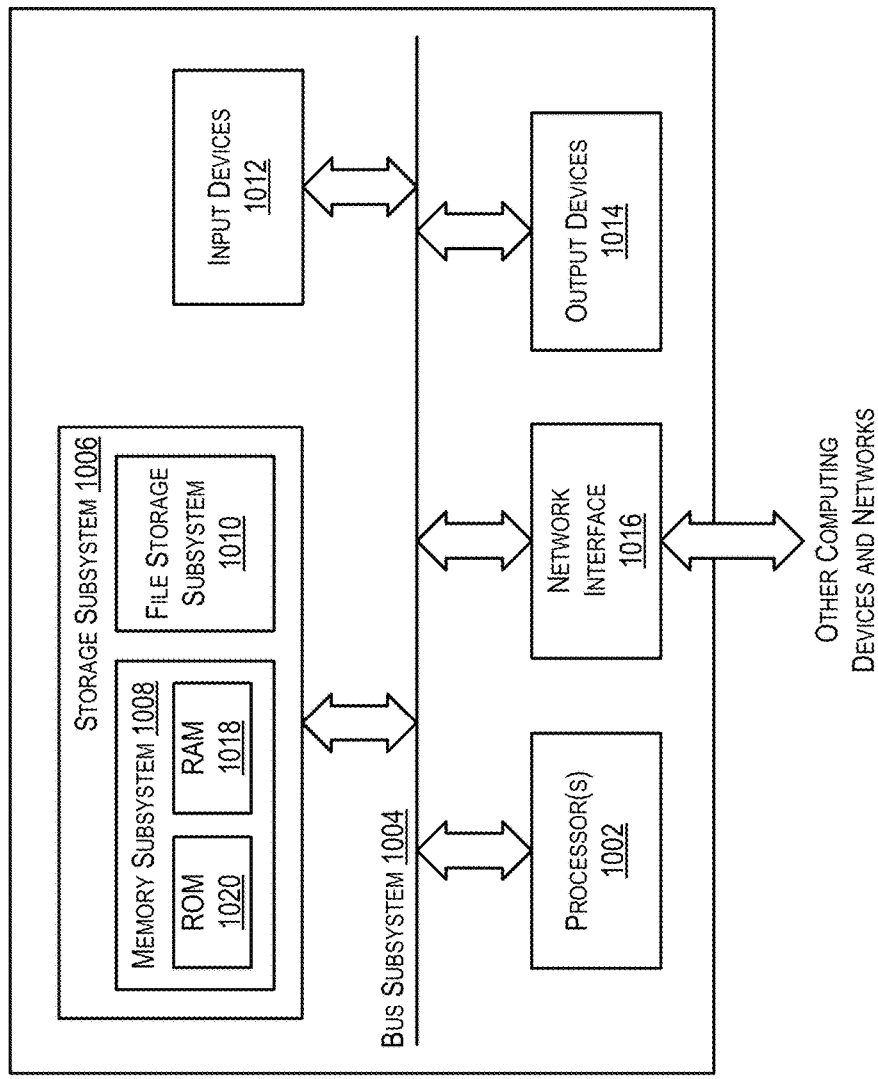
FIG. 10 depicts a simplified block diagram of an example computer system according to some embodiments.

The techniques describe above may be implemented in a wide range of computer systems configured to process neural networks. FIG. 10 depicts a simplified block diagram of an example computer system 1000, which can be used to implement the techniques described in the foregoing disclosure. In some embodiments, computer system 1000 may be used to implement compute elements 125*a-n*. As shown in FIG. 10, computer system 1000 includes one or more processors 1002 that communicate with a number of peripheral devices via a bus subsystem 1004. These peripheral devices may include a storage subsystem 1006 (e.g., comprising a memory subsystem 1008 and a file storage subsystem 1010) and a network interface subsystem 1016. Some computer systems may further include user interface input devices 1012 and/or user interface output devices 1014.

Bus subsystem 1004 can provide a mechanism for letting the various components and subsystems of computer system 1000 communicate with each other as intended. Although bus subsystem 1004 is shown schematically as a single bus, alternative embodiments of the bus subsystem can utilize multiple busses.

Network interface subsystem 1016 can serve as an interface for communicating data between computer system 1000 and other computer systems or networks. Embodiments of network interface subsystem 1016 can include, e.g., Ethernet, a Wi-Fi and/or cellular adapter, a modem (telephone, satellite, cable, ISDN, etc.), digital subscriber line (DSL) units, and/or the like.

Storage subsystem 1006 includes a memory subsystem 1008 and a file/disk storage subsystem 1010. Subsystems 1008 and 1010 as well as other memories described herein are examples of non-transitory computer-readable storage media that can store executable program code and/or data that provide the functionality of embodiments of the present disclosure.

Memory subsystem 1008 includes a number of memories including a main random access memory (RAM) 1018 for storage of instructions and data during program execution and a read-only memory (ROM) 1020 in which fixed instructions are stored. File storage subsystem 1010 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and many other configurations having more or fewer components than system 1000 are possible.

Figure 11:
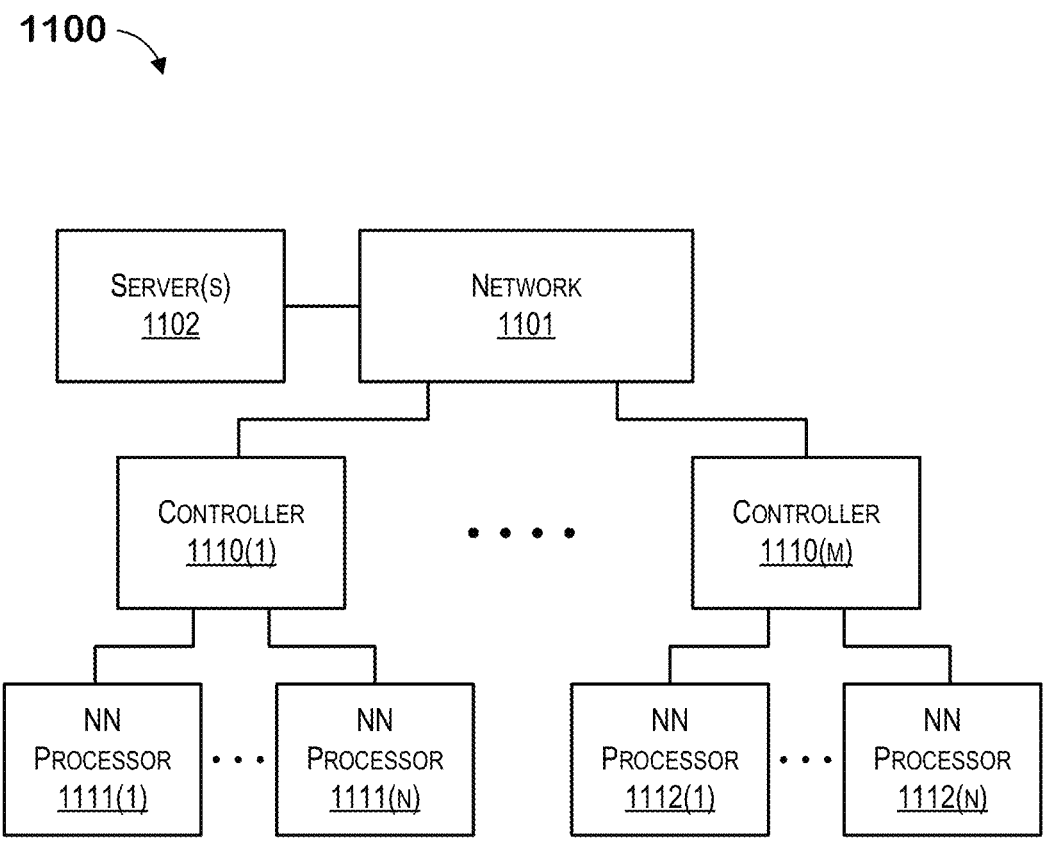
FIG. 11 illustrates a neural network processing system according to some embodiments.

FIG. 11 illustrates a neural network processing system 1100 according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1102, which may comprise architectures illustrated in FIG. 10 above, may be coupled to a plurality of controllers 1110(1)-1110(M) over a communication network 1101 (e.g. switches, routers, etc.). Controllers 1110(1)-1110(M) may also comprise architectures illustrated in FIG. 10 above. Each controller 1110(1)-1110(M) may be coupled to one or more NN processors, such as processors 1111(1)-1111(N) and 1112(1)-1112(N), for example. In some embodiments, NN processors 1111(1)-1111(N) and 1112(1)-1112(N) can be used to implement compute elements 125a-n. NN processors 1111(1)-1111(N) and 1112(1)-1112(N) may include a variety of configurations of functional processing blocks and memory optimized for neural network processing, such as training or inference. The NN processors are optimized for neural network computations. Server 1102 may configure controllers 1110 with NN models as well as input data to the models, which may be loaded and executed by NN processors 1111(1)-1111 (N) and 1112(1)-1112(N) in parallel, for example. Models may include layers and associated weights as described above, for example. NN processors may load the models and apply the inputs to produce output results. NN processors may also implement training algorithms described herein, for example.

FURTHER EXAMPLE EMBODIMENTS

In various embodiments, the present disclosure includes systems, methods, and apparatuses for training neural networks based on dual pipeline architectures. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising a first set of compute elements configured to implement a first set of layers of a first instance of a neural network and a second set of compute elements configured to implement a second set of layers of the first instance of the neural network. The second set of compute elements are further configured to implement a first set of layers of a second instance of the neural network. The first set of compute elements are further configured to implement a second set of layers of the second instance of the neural network. The first set of layers of the first instance of the neural network and the first set of layers of the second instance of the neural network are each configured to receive training data.

In one embodiment, the first instance of the neural network and the second instance of the neural network are configured to process training data in parallel.

In one embodiment, configuring the first set of compute elements to implement the first set of layers of the first instance of the neural network and the second set of layers of the second instance of the neural network and configuring the second set of compute elements to implement the second set of layers of the first instance of the neural network and the first set of layers of the second instance of the neural network improves the efficiency of training the first and second instances of the neural network.

In one embodiment, configuring the first set of compute elements to implement the first set of layers of the first instance of the neural network and the second set of layers of the second instance of the neural network and configuring the second set of compute elements to implement the second set of layers of the first instance of the neural network and the first set of layers of the second instance of the neural network improves memory utilization across the first and second sets of compute elements.

In one embodiment, the present disclosure includes a system comprising a first pipeline for training a first instance of a neural network and a second pipeline for training a second instance of the neural network. The first pipeline comprises a first artificial intelligent (AI) accelerator configured to implement a first layer of the first instance of the neural network and a second AI accelerator configured to implement a second layer of the first instance of the neural network. The second pipeline comprises the second AI accelerator further configured to implement a first layer of the second instance of the neural network and the first AI accelerator further configured to implement a second layer of the second instance of the neural network. The first layer of the first instance of the neural network and the first layer of the second instance of the neural network are each configured to receive training data.

In one embodiment, the present disclosure includes a method that configures a first set of compute elements to implement a first set of layers of a first instance of a neural network. The method further configuring a second set of compute elements to implement a second set of layers of the first instance of the neural network. The method also configures the second set of compute elements to implement a first set of layers of a second instance of the neural network. The method further configures the first set of compute elements to implement a second set of layers of the second instance of the neural network. The first set of layers of the first instance of the neural network and the first set of layers of the second instance of the neural network are each configured to receive training data.

In one embodiment, the present disclosure includes a system comprising a first set of compute elements configured to implement a first set of layers of a neural network and a second set of compute elements configured to implement a second set of layers of the neural network. A first compute element in the first set of compute elements is further configured to generate an output based on a particular set of training data and send the output to a second compute element in the second set of compute elements during a feed-forward training stage. The second compute element in the second set of compute elements is further configured to store the output.

In one embodiment, the first compute element in the first set of compute elements is further configured to retrieve the output from the second compute element in the second set of compute elements during a backpropagation training stage and adjust weights of a layer in the first set of layers based on the output.

In one embodiment, the first set of layers of the first instance of the neural network is configured to receive a set of training data every n cycles, wherein n is the number of cycles the first set of layers of the first instance of the neural network uses to process a feedforward pass and a back propagation pass.

In one embodiment, the present disclosure includes a method that configures a first set of compute elements to implement a first set of layers of a first instance of a neural network; configures a second set of compute elements to implement a second set of layers of the first instance of the neural network; configures the second set of compute elements to implement a first set of layers of a second instance of the neural network; and configures the first set of compute elements to implement a second set of layers of the second instance of the neural network. The first set of layers of the first instance of the neural network and the first set of layers of the second instance of the neural network are each configured to receive training data.

In one embodiment, the present disclosure includes a first pipeline for training a first instance of a neural network, the first pipeline comprising a first artificial intelligent (AI) accelerator configured to implement a first layer of the first instance of the neural network and a second AI accelerator configured to implement a second layer of the first instance of the neural network; and a second pipeline for training a second instance of a neural network, the second pipeline comprising the second AI accelerator further configured to implement a first layer of the second instance of the neural network and the first AI accelerator further configured to implement a second layer of the second instance of the neural network. The first layer of the first instance of the neural network and the first layer of the second instance of the neural network are each configured to receive training data.

In one embodiment, the present disclosure includes a system comprising a first set of compute elements configured to implement a first set of layers of a neural network; and a second set of compute elements configured to implement a second set of layers of the neural network. The first set of layers of the neural network is configured to receive a set of training data every n cycles, wherein n is the number of cycles the first set of layers of the neural network uses to process a feedforward pass and a back propagation pass.

In one embodiment, the present disclosure includes a system comprising a first set of compute elements configured to implement a first set of layers of a neural network; and a second set of compute elements configured to implement a second set of layers of the neural network. A first compute element in the first set of compute elements is further configured to generate an output based on a particular set of training data and send the output to a second compute element in the second set of compute elements during a feedforward training stage. The second compute element in the second set of compute elements is further configured to store the output.

In one embodiment, the first compute element in the first set of compute elements is further configured to retrieve the output from the second compute element in the second set of compute elements during a backpropagation training stage and adjust weights of a layer in the first set of layers based on the output.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
   a first set of computing hardware configured to implement a first set of layers including an input layer of a first instance of a neural network; and
   a second set of computing hardware configured to implement a second set of layers including an output layer of the first instance of the neural network;
   wherein the second set of computing hardware are further configured to implement a first set of layers including an input layer of a second instance of the neural network, the second instance being a separate instance of the neural network than the first instance;
   wherein the first set of computing hardware are further configured to implement a second set of layers including an output layer of the second instance of the neural network;
   wherein the first set of layers of the first instance of the neural network is configured to receive a first set of training data and process the first set of training data from the first set of layers to the second set of layers of the first instance of the neural network in a first feedforward pass,
   wherein the first set of layers of the second instance of the neural network is configured to receive a second set of training data and process the second set of training data from the first set of layers to the second set of layers of the second instance of the neural network in a second feedforward pass.

2. The system of claim 1, wherein the first instance of the neural network is configured to process the first set of training data in the first feedforward pass in parallel with the second instance of the neural network processing the second set of training data in the second feedforward pass.

3. The system of claim 1, wherein the first set of layers of the first instance of the neural network is further configured to receive a first set of training data during a feedforward stage of training the first instance of the neural network and store the first set of training data for processing during a backpropagation stage of training the first instance of the neural network, wherein the first set of layers of the second instance of the neural network is further configured to receive a second set of training data during a feedforward stage of training the second instance of the neural network and store the second set of training data for processing during a backpropagation stage of training the second instance of the neural network.

4. The system of claim 1, wherein configuring the first set of computing hardware to implement the first set of layers of the first instance of the neural network and the second set of layers of the second instance of the neural network and configuring the second set of computing hardware to implement the second set of layers of the first instance of the neural network and the first set of layers of the second instance of the neural network improves the efficiency of training the first and second instances of the neural network.

5. The system of claim 1, wherein configuring the first set of computing hardware to implement the first set of layers of the first instance of the neural network and the second set of layers of the second instance of the neural network and configuring the second set of computing hardware to implement the second set of layers of the first instance of the neural network and the first set of layers of the second instance of the neural network improves memory utilization across the first and second sets of computing hardware.

6. The system of claim 1, wherein the first set of layers of the first instance of the neural network is configured to receive a set of training data every n cycles, wherein n is the number of cycles the first set of layers of the first instance of the neural network uses to process a feedforward pass and a backpropagation pass.

7. A method comprising:
configuring a first set of computing hardware to implement a first set of layers including an input layer of a first instance of a neural network;
configuring a second set of computing hardware to implement a second set of layers including an output layer of the first instance of the neural network;
configuring the second set of computing hardware to implement a first set of layers including an input layer of a second instance of the neural network, the second instance being a an instance of the neural network that is independent of the first instance; and
configuring the first set of computing hardware to implement a second set of layers including an output layer of the second instance of the neural network,
wherein the first set of layers of the first instance of the neural network is configured to receive a first set of training data and process the first set of training data from the first set of layers to the second set of layers of the first instance of the neural network in a first feedforward pass,
wherein the first set of layers of the second instance of the neural network is configured to receive a second set of training data and process the second set of training data from the first set of layers to the second set of layers of the second instance of the neural network in a second feedforward pass.

8. The method of claim 7, wherein the first instance of the neural network and the second instance of the neural network are configured to process training data in parallel.

9. The method of claim 7 further comprising:
configuring the first set of layers of the first instance of the neural network to receive a first set of training data during a feedforward stage of training the first instance of the neural network;
configuring the first set of layers of the first instance of the neural network to store the first set of training data for processing during a backpropagation stage of training the first instance of the neural network
configuring the first set of layers of the second instance of the neural network to receive a second set of training data during a feedforward stage of training the second instance of the neural network; and
configuring the first set of layers of the second instance of the neural network to store the second set of training data for processing during a backpropagation stage of training the second instance of the neural network.

10. The method of claim 7, wherein configuring the first set of computing hardware to implement the first set of layers of the first instance of the neural network and the second set of layers of the second instance of the neural network and configuring the second set of computing hardware to implement the second set of layers of the first instance of the neural network and the first set of layers of the second instance of the neural network improves the efficiency of training the first and second instances of the neural network.

11. The method of claim 7, wherein configuring the first set of compute elements to implement the first set of layers of the first instance of the neural network and the second set of layers of the second instance of the neural network and configuring the second set of compute elements to implement the second set of layers of the first instance of the neural network and the first set of layers of the second instance of the neural network improves memory utilization across the first and second sets of compute elements.

12. A system comprising:
a first pipeline for training a first instance of a neural network, the first pipeline comprising a first artificial intelligence (AI) accelerator configured to implement an input layer of the first instance of the neural network and a second AI accelerator configured to implement an output layer of the first instance of the neural network; and
a second pipeline for training a second instance of the neural network that is separate from the first instance, the second pipeline comprising the second AI accelerator further configured to implement an input layer of the second instance of the neural network and the first AI accelerator further configured to implement an output layer of the second instance of the neural network,
wherein the first pipeline for training layer of the first instance of the neural network is configured to receive a first set of training data and process the first set of training data from the first AI accelerator to the second AI accelerator in a first feedforward pass,
wherein the second pipeline for training of the second instance of the neural network is configured to receive a second set of training data and process the second set of training data from the second AI accelerator to the first AI accelerator in a second feedforward pass.

13. The system of claim 12, wherein the first instance of the neural network and the second instance of the neural network are configured to process training data in parallel.

14. The system of claim 12, wherein the first pipeline implementing the first instance of the neural network is further configured to receive a first set of training data during a feedforward stage of training the first instance of the neural network and store the first set of training data for processing during a backpropagation stage of training the first instance of the neural network, wherein the second pipeline implementing the second instance of the neural network is further configured to receive a second set of training data during a feedforward stage of training the second instance of the neural network and store the second set of training data for processing during a backpropagation stage of training the second instance of the neural network.

15. The system of claim 12, wherein configuring the first AI accelerator to implement the input layer of the first instance of the neural network and the output layer of the second instance of the neural network and configuring the second AI accelerator to implement the output layer of the first instance of the neural network and the input layer of the second instance of the neural network improves the efficiency of training the first and second instances of the neural network.

16. The system of claim 12, wherein configuring the first AI accelerator to implement the input layer of the first instance of the neural network and the output layer of the second instance of the neural network and configuring the second AI accelerator to implement the output layer of the first instance of the neural network and the input layer of the second instance of the neural network improves memory utilization across the first and second AI accelerators.

\* \* \* \* \*